US012671178B2

(12) United States Patent
Banerjee et al.

(10) Patent No.: US 12,671,178 B2
(45) Date of Patent: Jun. 30, 2026

(54) TOPOLOGICALLY MODULATED REFLECTING INTELLIGENT SURFACES AND METHOD TO ENABLE SECTORAL AREA COVERAGE UNDER NETWORK APPLICATIONS

(71) Applicant: Tata Consultancy Services Limited, Mumbai (IN)

(72) Inventors: Amartya Banerjee, Kolkata (IN);
Soumya Chakravarty, Kolkata (IN);
Ritvika Sonawane, Hyderabad (IN);
Poornima Surojia, Hyderabad (IN);
Tapas Chakravarty, Kolkata (IN);
Rowdra Ghatak, Durgapur (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 377 days.

(21) Appl. No.: 18/403,815

(22) Filed: Jan. 4, 2024

(65) Prior Publication Data

US 2024/0364007 A1 Oct. 31, 2024

(30) Foreign Application Priority Data

Apr. 6, 2023 (IN) .............................. 202321025904

(51) Int. Cl.
| | |
|---|---|
| *H01Q 3/46* | (2006.01) |
| *H01Q 13/02* | (2006.01) |
| *H04W 16/26* | (2009.01) |

(52) U.S. Cl.
CPC .............. *H01Q 3/46* (2013.01); *H01Q 13/02* (2013.01); *H04W 16/26* (2013.01)

(58) Field of Classification Search
CPC .......... H01Q 3/46; H01Q 13/02; H04W 16/26
See application file for complete search history.

(56) References Cited

U.S. PATENT DOCUMENTS 6,104,349 A * 8/2000 Cohen .................. H01Q 21/205
343/702
6,140,975 A * 10/2000 Cohen ...................... H01Q 9/36
343/846
(Continued)

FOREIGN PATENT DOCUMENTS

CN 102798901 B 1/2015
EP 4564603 A1 * 6/2025 ............ H04W 16/28
(Continued)

OTHER PUBLICATIONS

S. Costanzo et al., "Miniaturized Fractal Reflectarray Element Using fixed-sized Patch", Aug. 4, 2014, IEEE, pp. 1437-1440. (Year: 2014).*
(Continued)

*Primary Examiner* — Hai V Nguyen
(74) *Attorney, Agent, or Firm* — FINNEGAN, HENDERSON, FARABOW, GARRETT & DUNNER LLP

(57) ABSTRACT

The advent of fifth generation technology systems leads to seamless connectivity requirements for IoT-based applications. High frequencies of operation lead to inherent problem of path loss, and to mitigate designing of passive reflecting intelligent surfaces for practical operations are challenging. This disclosure relates a method to enable sectoral area coverage under network applications by topologically modulated reflecting intelligent surfaces. A Minkowski-shaped fractal unit cell is received as an input. The Minkowski-shaped fractal unit cell is characterized to obtain unit cell dimension with independent reflection-phase characteristics. The independent reflection-phase characteristics are utilized to identify distinct unit cell elements. Surface layouts are generated by the distinct unit cell elements. The surface layouts are characterized with respect to an incoming source radiation pattern to identify reflected
(Continued)

radiation pattern parameters. The real-time sectoral signal coverage is designed based on the reflected radiation pattern parameters of the surface layouts and position of Ku-band horn antennas.

15 Claims, 15 Drawing Sheets

(56) References Cited

U.S. PATENT DOCUMENTS

| | | | | |
|---|---|---|---|---|
| 6,452,553 B1* | 9/2002 | Cohen | H01Q 1/36 343/702 |
| 6,476,766 B1* | 11/2002 | Cohen | H01Q 21/28 343/846 |
| 6,982,679 B2* | 1/2006 | Kralovec | H01Q 19/19 343/781 CA |
| 7,019,695 B2* | 3/2006 | Cohen | H01Q 15/0093 343/846 |
| 7,145,513 B1* | 12/2006 | Cohen | H01Q 1/36 343/702 |
| 7,215,290 B2* | 5/2007 | Cohen | H01Q 1/36 343/702 |
| 7,256,751 B2* | 8/2007 | Cohen | H01Q 1/36 343/792.5 |
| 7,750,856 B2* | 7/2010 | Cohen | H01Q 1/246 343/702 |
| 8,537,067 B2* | 9/2013 | Tahmisian, Jr. | H01Q 13/02 343/786 |
| 9,967,884 B2* | 5/2018 | Emmanuel | H04W 16/20 |
| 10,015,791 B2* | 7/2018 | Akhavan-Saraf | H04W 24/02 |
| 10,193,236 B1* | 1/2019 | Lee | H01Q 21/24 |
| 10,340,573 B2* | 7/2019 | Johnson | H01Q 13/106 |
| 10,425,214 B2* | 9/2019 | Safavi | H04B 7/0626 |
| 10,530,440 B2* | 1/2020 | Bisiules | H01Q 21/065 |
| 10,575,188 B1* | 2/2020 | Abielmona | H04B 7/0408 |
| 10,965,041 B2* | 3/2021 | Taptic | H01Q 15/24 |
| 11,025,460 B2* | 6/2021 | Henry | H04W 16/18 |
| 11,533,100 B2* | 12/2022 | Higgins | H04W 48/16 |
| 12,014,510 B2* | 6/2024 | Rodrigues | G06T 7/557 |
| 12,251,193 B2* | 3/2025 | Wang | G01J 3/42 |
| 12,418,115 B2* | 9/2025 | Abramovich | H01Q 3/46 |
| 2003/0151556 A1* | 8/2003 | Cohen | H01Q 5/371 343/702 |
| 2003/0160723 A1* | 8/2003 | Cohen | H01Q 1/36 343/702 |
| 2005/0088355 A1* | 4/2005 | Kralovec | H01Q 13/0208 343/781 P |
| 2006/0164308 A1* | 7/2006 | Cohen | H01Q 9/0407 343/700 MS |
| 2007/0216585 A1* | 9/2007 | Cohen | H01Q 21/20 343/702 |
| 2008/0180341 A1* | 7/2008 | Cohen | H01Q 21/28 343/792.5 |
| 2008/0252530 A1* | 10/2008 | Bae | H01Q 1/2208 343/700 MS |
| 2009/0267852 A1* | 10/2009 | Tahmisian, Jr. | H01Q 25/02 343/786 |
| 2011/0095955 A1* | 4/2011 | Cohen | H01Q 1/38 343/837 |
| 2014/0295793 A1* | 10/2014 | Griffioen | H04L 63/0823 455/411 |
| 2017/0135104 A1* | 5/2017 | Emmanuel | H04L 43/0894 |
| 2018/0332563 A1* | 11/2018 | Sihlbom | H04W 48/10 |
| 2019/0028159 A1* | 1/2019 | Bisiules | H01Q 5/48 |
| 2019/0109696 A1* | 4/2019 | Safavi | H04B 7/0626 |
| 2019/0190588 A1* | 6/2019 | Higgins | H04W 48/16 |
| 2019/0386364 A1 | 12/2019 | Liang et al. | |
| 2020/0083614 A1* | 3/2020 | Sanford | H01Q 21/08 |
| 2022/0239007 A1* | 7/2022 | Biswas | H01Q 3/2658 |
| 2023/0136472 A1* | 5/2023 | Abramovich | H01Q 19/18 342/368 |
| 2023/0284907 A1* | 9/2023 | Wang | G01J 3/42 |
| 2023/0284925 A1* | 9/2023 | Wang | H01Q 1/248 |
| 2023/0291119 A1* | 9/2023 | Chakravarty | H01Q 3/38 |
| 2025/0175218 A1* | 5/2025 | Banerjee | H04B 7/04013 |

FOREIGN PATENT DOCUMENTS

| | | | | |
|---|---|---|---|---|
| SG | 166150 A1 * | 11/2010 | | |
| WO | WO2021150384 A1 | 7/2021 | | |
| WO | WO2022012040 A1 | 1/2022 | | |
| WO | WO2022133957 A1 | 6/2022 | | |
| WO | WO-2023084347 A1 * | 5/2023 | | H01Q 15/0033 |

OTHER PUBLICATIONS

Liu Yufeng et al., "A Sub-wavelength Reflectarray Element Based on Minkowski Fractal Loop", May 7, 2018, IEEE, XP033465323, pp. 1-3 (Year: 2018).*

A Sub-wavelength Reflectarray Element Based on Minkowski Fractal Loop (Year: 2018).*

Miniaturized Fractal Reflectarray Element Using Fixed-Size Patch (Year: 2014).*

Biswarup Rana et al., "Parameters and Measurement Techniques of Reconfigurable Intelligent Surfaces," Micromachines, 2022, vol. 13; Issue: 11, MDPI, https://www.mdpi.com/2072-666X/13/11/1841.

Teena Sharma et al., "Reconfigurable Intelligent Surfaces for 5G and beyond Wireless Communications: A Comprehensive Survey," Energies, 2021, vol. 14; Issue: 24, MDPI, https://www.mdpi.com/1996-1073/14/24/8219.

* cited by examiner

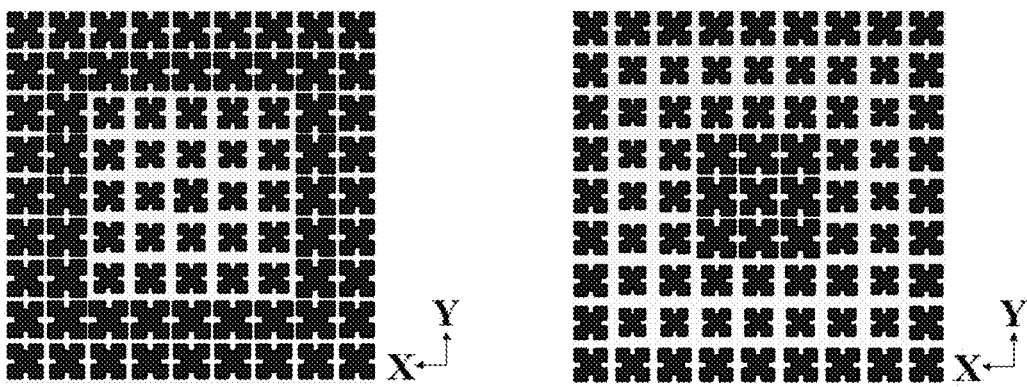
FIG. 6A                    FIG. 6B
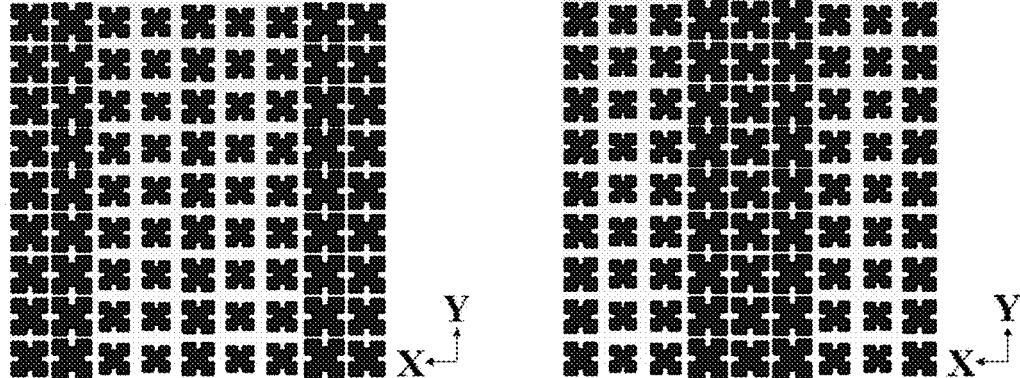
FIG. 6C                    FIG. 6D

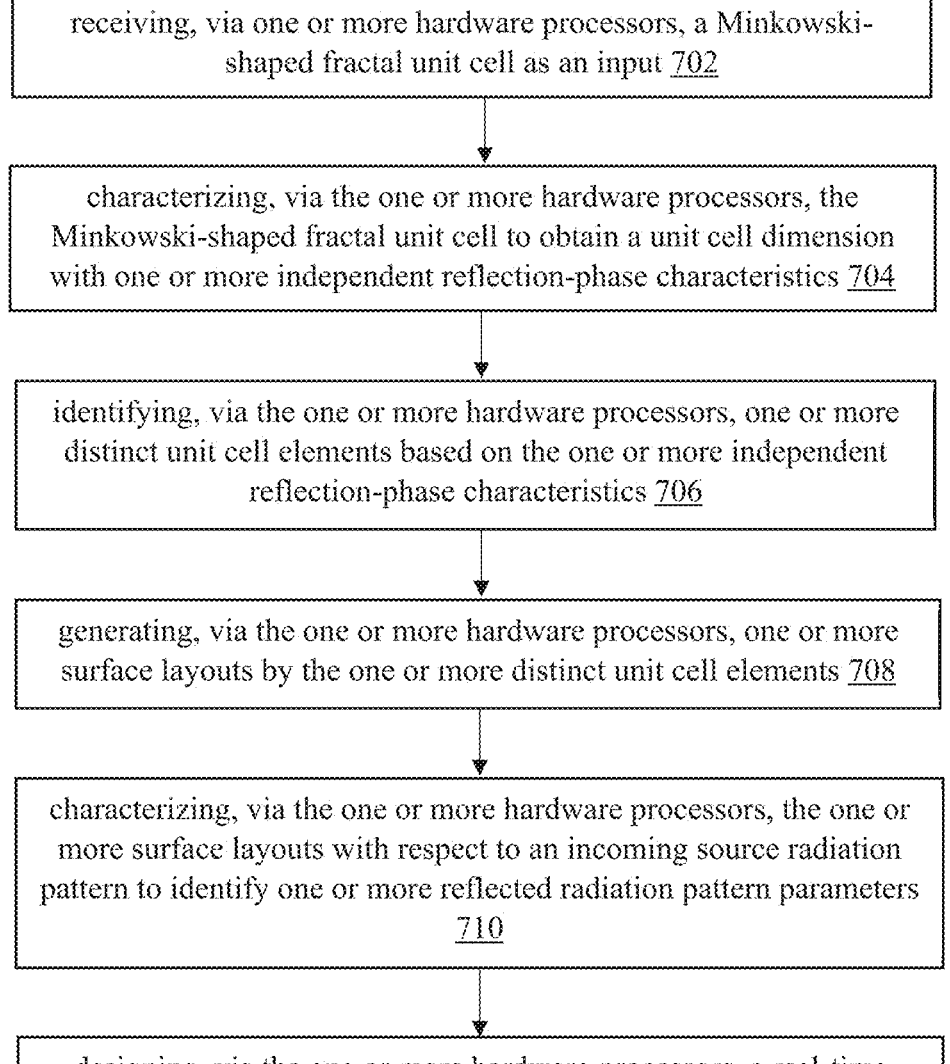

receiving, via one or more hardware processors, a Minkowski-shaped fractal unit cell as an input 702 characterizing, via the one or more hardware processors, the Minkowski-shaped fractal unit cell to obtain a unit cell dimension with one or more independent reflection-phase characteristics 704 identifying, via the one or more hardware processors, one or more distinct unit cell elements based on the one or more independent reflection-phase characteristics 706 generating, via the one or more hardware processors, one or more surface layouts by the one or more distinct unit cell elements 708 characterizing, via the one or more hardware processors, the one or more surface layouts with respect to an incoming source radiation pattern to identify one or more reflected radiation pattern parameters 710 designing, via the one or more hardware processors, a real-time sectoral signal coverage based on the one or more reflected radiation pattern parameters of the designed one or more surface layouts and position of one or more Ku-band horn antennas 712

FIG. 7

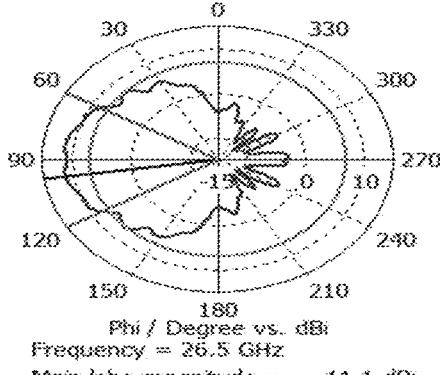
Farfield Realized Gain Abs (Theta=147)
Phi / Degree vs. dBi
Frequency = 26.5 GHz
Main lobe magnitude =     11.1 dBi
Main lobe direction =    98.0 deg.
Angular width (3 dB) =    60.8 deg.
Side lobe level =    −4.0 dB
FIG. 9C
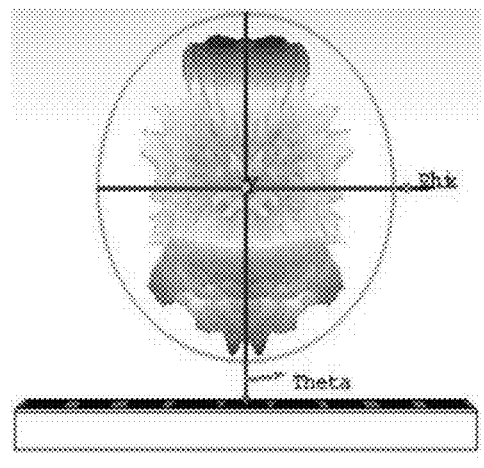
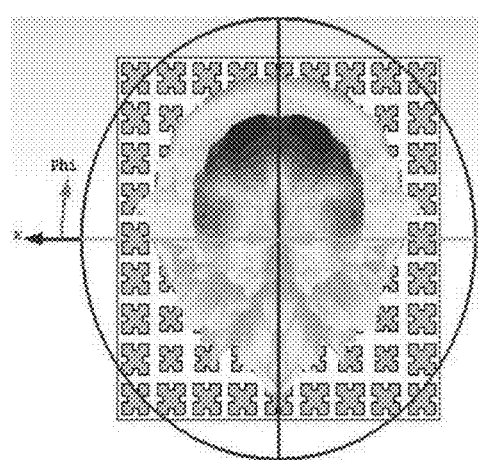
FIG. 9D                                    FIG. 9E

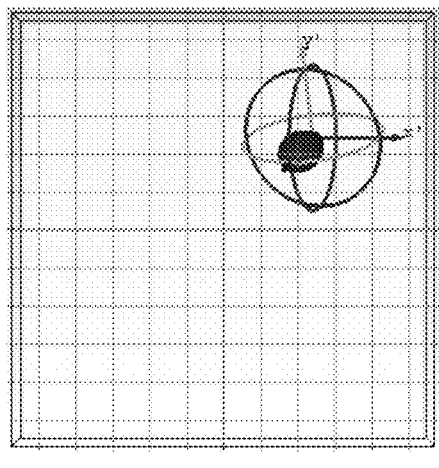
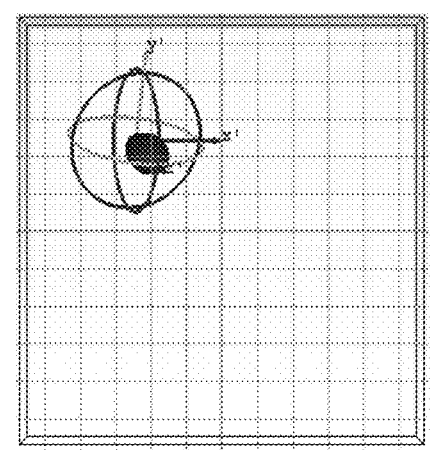
FIG. 10E
FIG. 10F
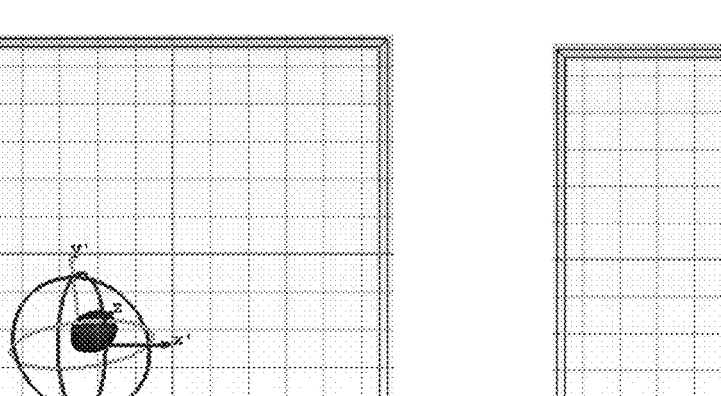
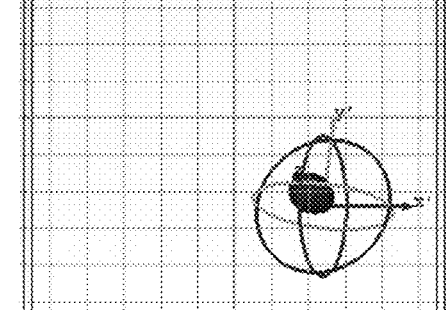
FIG. 10G
FIG. 10H

TOPOLOGICALLY MODULATED REFLECTING INTELLIGENT SURFACES AND METHOD TO ENABLE SECTORAL AREA COVERAGE UNDER NETWORK APPLICATIONS

PRIORITY CLAIM

This U.S. patent application claims priority under 35 U.S.C. § 119 to: India application No. 202321025904, filed on Apr. 6, 2023. The entire contents of the aforementioned application are incorporated herein by reference.

TECHNICAL FIELD

This disclosure relates generally to network applications, and, more particularly, to topologically modulated reflecting intelligent surfaces and method to enable sectoral area coverage under network applications.

BACKGROUND

With the advent of fifth generation (5G) technology systems and sharp rise in seamless connectivity requirements for IoT-based applications, a smart radio environment that provides a solution, which has become focal point of academic and industrial research nowadays. At such high frequencies of operation, the inherent problem of path loss needs to be mitigated for wireless communication and consequently antenna researchers are delved into finding feasible solutions for such purposes. Accordingly, for free license 5G bands such as frequency range 2 (FR2) band of frequencies (i.e., ranging around 26-28 GHz), high-gain, highly directive antennas are suggested for practical installation. On the other hand, for office-area networks, IoT-based environments, or device-to-device (D2D) communication systems the antenna beam needs to be directive as well as controllable through multiple spatial paths to coordinate with the associated components present in the surroundings.

Reflecting intelligent surfaces are generally defined as two-dimensional structures with large number of sub-wavelengths reflecting elements, most of the time loaded with active electronic components like diodes or varactors on them. These active devices are responsible for providing a phase-shift to the reflected wave which allows the beam to be reflected towards a specific direction, and not solely at an angle of reflection that equals to the angle of incidence only. The components further control the shift in phase, in real-time, thus justifying the adjective intelligent for such surfaces. Therefore, such structures almost inherently are proposed as multi-layer designs with dependency on electronic circuitry and voltage biasing techniques for practical operations. With the advent of metamaterials and meta surface designs, the idea of having different geometric shapes, by changing whose physical dimensions only one can control the phase-reflection characteristics for such reflecting elements, came into being and influenced the community of engineers. Systems to realize single layer, completely passive reflecting intelligent surfaces to sustain practical operations under 5G use-case scenarios are challenging at this juncture.

SUMMARY

Embodiments of the present disclosure present technological improvements as solutions to one or more of the above-mentioned technical problems recognized by the inventors in conventional systems. For example, in one embodiment, a processor implemented method of enabling a real-time sectoral area coverage by a topologically modulated reflecting intelligent surfaces (RIS) is provided. The processor implemented method includes at least one of: receiving, via one or more hardware processors, a Minkowski-shaped fractal unit cell as an input; characterizing, via the one or more hardware processors, the Minkowski-shaped fractal unit cell to obtain a unit cell dimension with one or more independent reflection-phase characteristics; identifying, via the one or more hardware processors, one or more distinct unit cell elements based on the one or more independent reflection-phase characteristics; generating, via the one or more hardware processors, one or more surface layouts by the one or more distinct unit cell elements; characterizing, via the one or more hardware processors, the one or more surface layouts with respect to an incoming source radiation pattern to identify one or more reflected radiation pattern parameters; and designing, via the one or more hardware processors, a real-time sectoral signal coverage based on the one or more reflected radiation pattern parameters of the designed one or more surface layouts and position of one or more Ku-band horn antennas. The Minkowski-shaped fractal unit cell corresponds to a reflecting unit cell under subwavelength conditions. The unit cell dimension corresponds to the shape of the Minkowski-shaped fractal unit cell. The one or more independent reflection-phase characteristics corresponds to a reflecting nature of one or more unit cell elements over a desired range of frequency. The one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof.

In an embodiment, the one or more surface layouts corresponds to: (i) concentric surface layouts, (ii) reverse concentric surface layouts, (iii) symmetric surface layouts, and (iv) reverse symmetric surface layouts. In an embodiment, the concentric surface layouts and the reverse concentric surface layouts are designed by distributing the identified one or more distinct unit cell elements to obtain a radially variant homogeneous phase gradient. In an embodiment, the symmetric surface layouts and the reverse symmetric surface layouts are designed by distributing the identified one or more distinct unit cell elements to obtain a longitudinally variant homogeneous phase gradient. In an embodiment, an angle of incidence value of the incoming source radiation pattern is varied which is incident at a central region of the one or more surface layouts to control an angle of reflection value. In an embodiment, the angle of incidence value of the incoming source radiation pattern is varied which is gradually sweeping over the one or more surface layouts, then the angle of reflection remains within a constant range. In an embodiment, the value of the angle of reflection is increased or decreased based on selection of the one or more surface layouts. In an embodiment, the incoming source radiation pattern corresponds to a spatial power distribution of one or more one Ku-band horn antennas operating at the desired range of frequency. In an embodiment, the incoming source radiation pattern from the one or more Ku-band horn antennas which is in conical shape is reflected to a desired direction in a shape of a sectoral fan-beam pattern.

In another aspect, there is provided a system to enable a sectoral area coverage under network applications by a topologically modulated reflecting intelligent surfaces. The system includes a memory storing instructions, one or more communication interfaces, and one or more hardware processors coupled to the memory via the one or more communication interfaces, wherein the one or more hardware processors are configured by the instructions to: receive, a Minkowski-shaped fractal unit cell as an input; characterize, the Minkowski-shaped fractal unit cell to obtain a unit cell dimension with one or more independent reflection-phase characteristics; identify, one or more distinct unit cell elements based on the one or more independent reflection-phase characteristics; generate, one or more surface layouts by the one or more distinct unit cell elements; characterize, the one or more surface layouts with respect to an incoming source radiation pattern to identify one or more reflected radiation pattern parameters; and design, a real-time sectoral signal coverage based on the one or more reflected radiation pattern parameters of the designed one or more surface layouts and position of one or more Ku-band horn antennas. The Minkowski-shaped fractal unit cell corresponds to a reflecting unit cell under subwavelength conditions. The unit cell dimension corresponds to the shape of the Minkowski-shaped fractal unit cell. The one or more independent reflection-phase characteristics corresponds to a reflecting nature of one or more unit cell elements over a desired range of frequency. The one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof.

In an embodiment, the one or more surface layouts corresponds to: (i) concentric surface layouts, (ii) reverse concentric surface layouts, (iii) symmetric surface layouts, and (iv) reverse symmetric surface layouts. In an embodiment, the concentric surface layouts and the reverse concentric surface layouts are designed by distributing the identified one or more distinct unit cell elements to obtain a radially variant homogeneous phase gradient. In an embodiment, the symmetric surface layouts and the reverse symmetric surface layouts are designed by distributing the identified one or more distinct unit cell elements to obtain a longitudinally variant homogeneous phase gradient. In an embodiment, an angle of incidence value of the incoming source radiation pattern is varied which is incident at a central region of the one or more surface layouts to control an angle of reflection value. In an embodiment, the angle of incidence value of the incoming source radiation pattern is varied which is gradually sweeping over the one or more surface layouts, then the angle of reflection remains within a constant range. In an embodiment, the value of the angle of reflection is increased or decreased based on selection of the one or more surface layouts. In an embodiment, the incoming source radiation pattern corresponds to a spatial power distribution of one or more one Ku-band horn antennas operating at the desired range of frequency. In an embodiment, the incoming source radiation pattern from the one or more Ku-band horn antennas which is in conical shape is reflected to a desired direction in a shape of a sectoral fan-beam pattern.

In yet another aspect, there are provided one or more non-transitory machine readable information storage mediums comprising one or more instructions which when executed by one or more hardware processors causes at least one of: receiving, a Minkowski-shaped fractal unit cell as an input; characterizing, the Minkowski-shaped fractal unit cell to obtain a unit cell dimension with one or more independent reflection-phase characteristics; identifying, one or more distinct unit cell elements based on the one or more independent reflection-phase characteristics; generating, one or more surface layouts by the one or more distinct unit cell elements; characterizing, the one or more surface layouts with respect to an incoming source radiation pattern to identify one or more reflected radiation pattern parameters; and designing, a real-time sectoral signal coverage based on the one or more reflected radiation pattern parameters of the designed one or more surface layouts and position of one or more Ku-band horn antennas. The Minkowski-shaped fractal unit cell corresponds to a reflecting unit cell under subwavelength conditions. The unit cell dimension corresponds to the shape of the Minkowski-shaped fractal unit cell. The one or more independent reflection-phase characteristics corresponds to a reflecting nature of one or more unit cell elements over a desired range of frequency. The one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof.

In an embodiment, the one or more surface layouts corresponds to: (i) concentric surface layouts, (ii) reverse concentric surface layouts, (iii) symmetric surface layouts, and (iv) reverse symmetric surface layouts. In an embodiment, the concentric surface layouts and the reverse concentric surface layouts are designed by distributing the identified one or more distinct unit cell elements to obtain a radially variant homogeneous phase gradient. In an embodiment, the symmetric surface layouts and the reverse symmetric surface layouts are designed by distributing the identified one or more distinct unit cell elements to obtain a longitudinally variant homogeneous phase gradient. In an embodiment, an angle of incidence value of the incoming source radiation pattern is varied which is incident at a central region of the one or more surface layouts to control an angle of reflection value. In an embodiment, the angle of incidence value of the incoming source radiation pattern is varied which is gradually sweeping over the one or more surface layouts, then the angle of reflection remains within a constant range. In an embodiment, the value of the angle of reflection is increased or decreased based on selection of the one or more surface layouts. In an embodiment, the incoming source radiation pattern corresponds to a spatial power distribution of one or more one Ku-band horn antennas operating at the desired range of frequency. In an embodiment, the incoming source radiation pattern from the one or more Ku-band horn antennas which is in conical shape is reflected to a desired direction in a shape of a sectoral fan-beam pattern.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figures 5A, 5B, 5C, 5D:
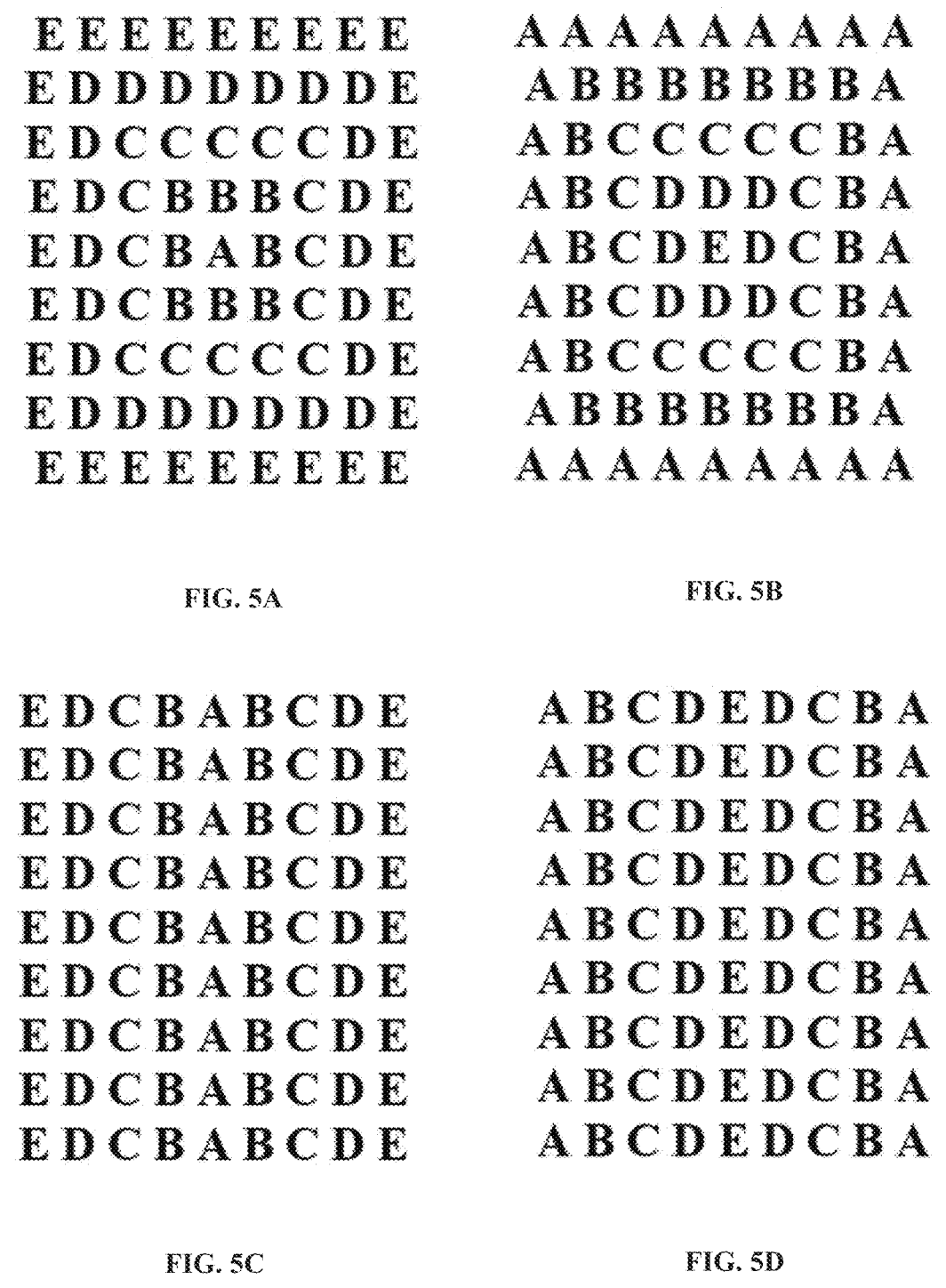

FIG. 5A through FIG. 5D are schematic representations illustrating one or more surface layouts using different cell types, according to some embodiments of the present disclosure.

FIG. 6A through FIG. 6D are exemplary schematic representations illustrating actual physical layout designs of one or more surface layouts based on the Minkowski-shaped fractal unit cells for reflecting intelligent surfaces, according to some embodiments of the present disclosure.

FIG. 7 is an exemplary flow diagram illustrating a method of enabling the real-time sectoral area coverage by the topologically modulated reflecting intelligent surfaces (RIS), according to some embodiments of the present disclosure.

FIG. 9A through FIG. 9E are exemplary schematic representations illustrating one or more parameters of interest in characterization of the designed reflecting surfaces, according to some embodiments of the present disclosure.

FIG. 10A through FIG. 10H are exemplary schematic representations illustrating different horn antenna positions for irradiating a particular reflecting surface, according to some embodiments of the present disclosure.

DETAILED DESCRIPTION

Figure 1:
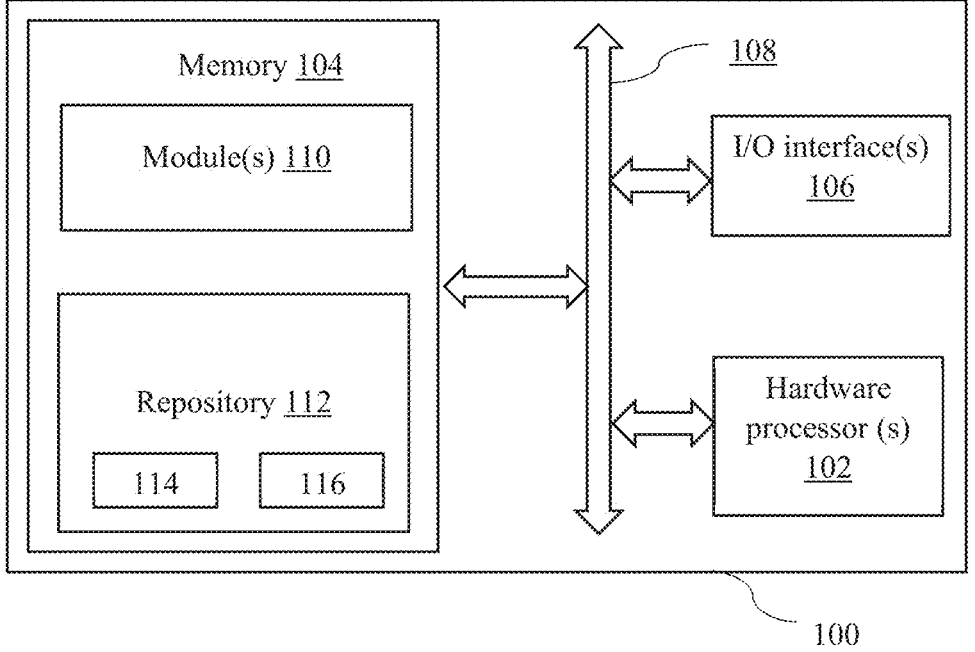
FIG. 1 is a system to illustrate a topologically modulated reflecting intelligent surfaces (RIS) to enable a real-time sectoral area coverage under network applications, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need to design a class of entirely passive reflecting intelligent surfaces (RIS) for practical applications under network-based office environment or device to device (D2D) communication scenarios. Embodiments of the present disclosure provide a method and system for enabling a real time sectoral area communication coverage under practical office environment conditions by designing a class of topologically modulated passive reflecting intelligent surfaces (RIS). The embodiment of the present disclosure utilizes metamaterial-based unit cell elements e.g., Minkowski-shaped fractal unit cell elements are designed and characterized to identify five distinct and specific unit cell dimensions each providing independent and distinguishable reflection-phase characteristics. The design of reflecting intelligent surfaces i.e., four distinct surface layouts (e.g., concentric, reverse concentric, symmetric, and reverse symmetric) based on nature of reflection-phase gradient to be maintained for each of the surfaces. The individual surface layouts are characterized based on probable directions of incoming, incident radiations, and each of the surfaces quantitatively described independent reflection characteristics. The proposed entirely passive and dimensionally symmetric reflecting intelligent surfaces (RIS) can reflect the incoming signal towards eight different and distinct sectors in space, depending on the source position of the configuration. The design of the integrated system with three horn antennas along with a particular reflecting surface, augmented together to realize a tri-sectoral coverage option for each of the system configurations.

Referring now to the drawings, and more particularly to FIGS. 1 through 12, where similar reference characters denote corresponding features consistently throughout the figures, there are shown preferred embodiments, and these embodiments are described in the context of the following exemplary system and/or method.

FIG. 1 is a system 100 to illustrates the topologically modulated reflecting intelligent surfaces (RIS) to enable the real-time sectoral area coverage under network applications, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The system 100 is further connected to a radar and antenna unit (Not Shown in figure) via the I/O interface(s) 106. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
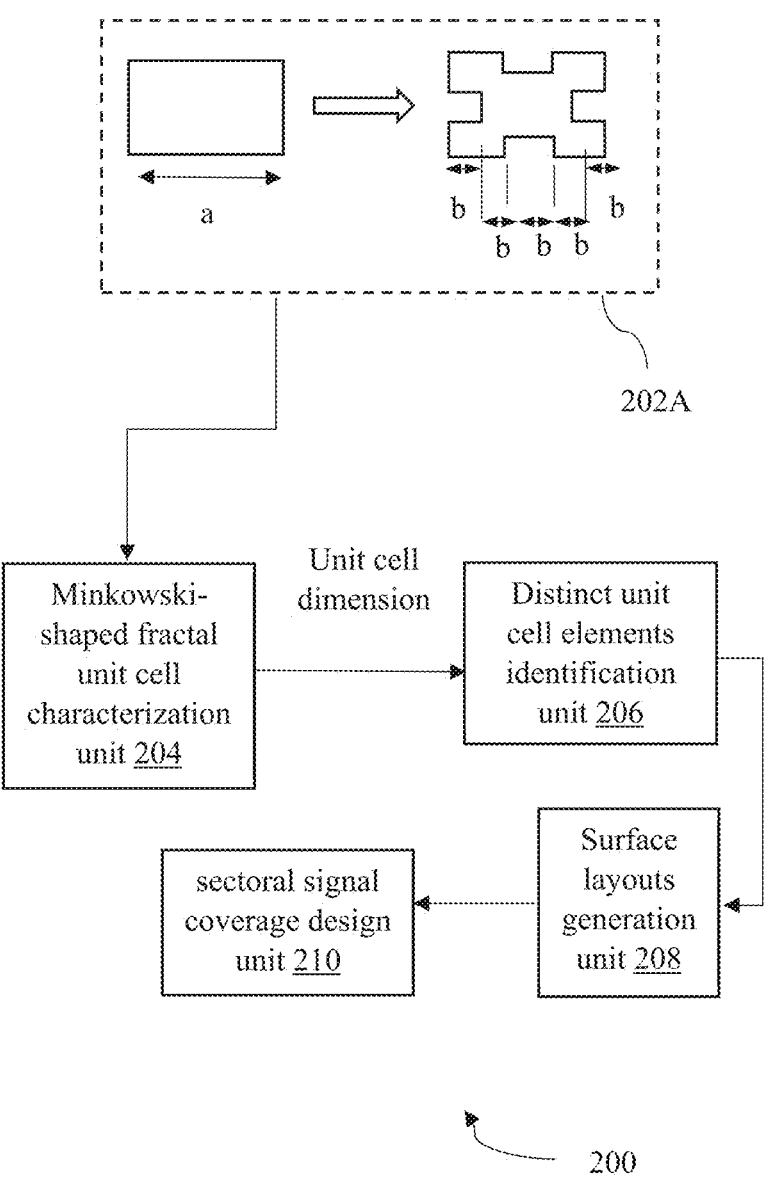
FIG. 2 illustrates an exemplary block diagram of the system of FIG. 1, according to some embodiments of the present disclosure.
Figure 3A:
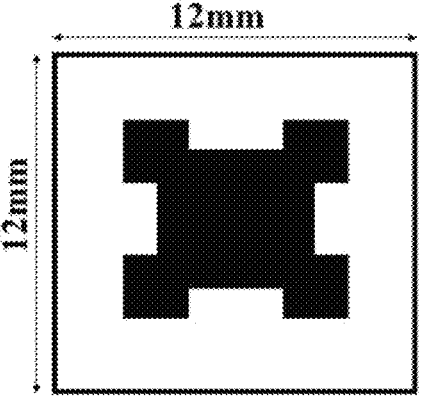
FIG. 3A and FIG. 3B illustrate schematic top view and side view of the generated Minkowski-shaped fractal unit cell respectively as depicted in FIG. 2, according to some embodiments of the present disclosure.
Figure 3B:
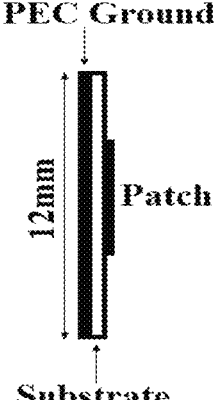

FIG. 2 illustrates an exemplary block diagram of the system 100 of FIG. 1, according to some embodiments of the present disclosure. The system 200 may be an example of the system 100 (FIG. 1). FIG. 3A and FIG. 3B illustrate schematic top view and side view of generated Minkowski-shaped fractal unit cell 202A respectively as depicted in FIG. 2, according to some embodiments of the present disclosure. In an example embodiment, the system 200 may be embodied in, or is in direct communication with the system, for example the system 100 (FIG. 1). The system 200 includes the Minkowski-shaped fractal unit cell 202A, a Minkowski-shaped fractal unit cell characterization unit 204, a distinct unit cell elements identification unit 206, a surface layouts generation unit 208, and a sectoral signal coverage design unit 210. A Minkowski-shaped fractal unit cell 202A is received as an input. The Minkowski-shaped fractal unit cell 202A corresponds to one or more reflecting unit cells under subwavelength conditions. The Minkowski-shaped fractal unit cell characterization unit 204 is configured to characterize the Minkowski-shaped fractal unit cell 202A to obtain a unit cell dimension with one or more independent reflection-phase characteristics. The unit cell dimension corresponds to shape of the Minkowski-shaped fractal unit cell 202A. The one or more independent reflection-phase characteristics corresponds to a reflecting nature of one or more unit cell elements over a desired range of frequency. For example, the desired range of frequency is a FR2 band of frequencies ranging around 26-28 GHz. The Minkowski-shaped fractal unit cell 202A is rigorously characterized to identifying five distinct unit and quantifiable unit cell dimensions having five independent reflection-phase characteristics to conceive larger periodic layouts for designing the reflecting intelligent surfaces (RIS).

For example, the Minkowski-shaped fractal unit cell 202A with a starting dimension of 'a', and correspondingly unit cell dimensions are characterized under Floquet mode conditions. Accordingly, different unit cells are characterized by using the floquet mode analysis for different values of dimension 'a' to specify fractal shape, which led to the identification of five distinct dimensions providing reflection-phase characteristics.

Figure 4A:
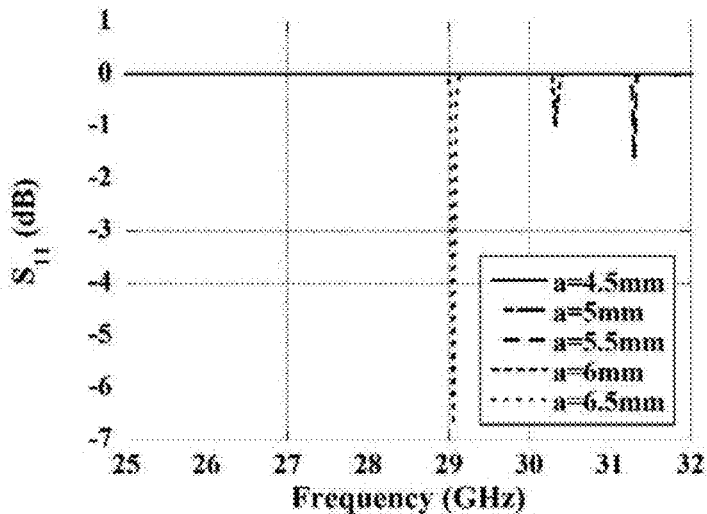
FIG. 4A and FIG. 4B are graphical representations illustrate a $S_{11}$ magnitude, and phase plots for unit cell characterization using floquet mode analysis for different dimensions of a fractal shape respectively, according to some embodiments of the present disclosure.
Figure 4B:
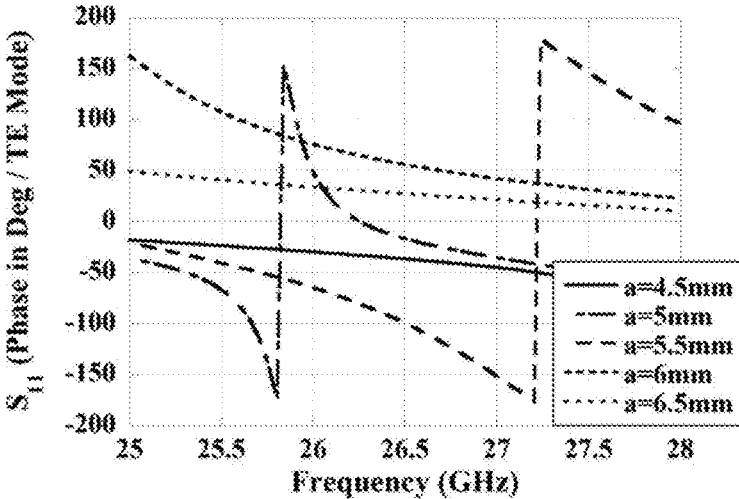

FIG. 4A and FIG. 4B are graphical representations illustrate a $S_{11}$ magnitude, and phase plots for unit cell characterization using floquet mode analysis for different dimensions of the fractal shape respectively, according to some embodiments of the present disclosure. The magnitude of $S_{11}$ coefficients lying very near to the 0 dB mark in the plots confirming total reflection of the incoming signal. Similarly, distinctly different reflection-phase characteristics for the individual cell dimensions. The different phase values obtained for different unit cell dimensions, at a particular frequency of 26.5 GHz in ascending order of magnitude, are highlighted at TABLE 1. TABLE 1 acts as a ready-reference look-up table for designing the larger surfaces.

TABLE 1

| SI. No. | Cell Dimension ('a') | Reflection Phase @ 26.5 GHz | Cell Type |
|---------|----------------------|------------------------------|-----------|
| 1 | 5.5 mm | −100 degree | A |
| 2 | 4.5 mm | −30 degree | B |
| 3 | 5 mm | −15 degree | C |
| 4 | 6.5 mm | +30 degree | D |
| 5 | 6 mm | +50 degree | E |

The distinct unit cell elements identification unit 206 is configured to identify one or more distinct unit cell elements based on the one or more independent reflection-phase characteristics.

FIG. 5A through FIG. 5D are schematic representations illustrating one or more surface layouts using different cell types, according to some embodiments of the present disclosure. FIG. 6A through FIG. 6D are exemplary schematic representations illustrating actual physical layout designs of one or more surface layouts based on the Minkowski-shaped fractal unit cells for reflecting intelligent surfaces, according to some embodiments of the present disclosure. The surface layouts generation unit 208 is configured to generate one or more surface layouts by the one or more distinct unit cell elements based on nature of reflection-phase gradient to be observed or maintained for each of the surfaces, each of the surface layouts being suitable for operation at frequency range e.g., 26.5 GHz. In an embodiment, each of the surface layouts quantitatively describes independent reflection properties suitable for practical operations. The one or more surface layouts corresponds to: (i) concentric surface layouts, (ii) reverse concentric surface layouts, (iii) symmetric surface layouts, and (iv) reverse symmetric surface layouts. The concentric surface layouts and the reverse concentric surface layouts are designed by distributing the identified one or more distinct unit cell elements to obtain a radially variant homogeneous phase gradient. The symmetric surface layouts and the reverse symmetric surface layouts are designed by distributing the identified one or more distinct unit cell elements to obtain a longitudinally variant homogeneous phase gradient. The arrangements are chosen to maintain a gradual and continuous gradient of phase reflection characteristics over spatial bounds of the concerned individual surfaces i.e., for each of the surfaces a specific guideline or design procedure is maintained to conceive the final layout.

For example, if one considers the concentric structure, central unit cell element dimensions are chosen to offer minimum phase to the reflected signal, and consequently, the other elements are placed in a manner so that the offered phase to the reflected signal gradually increases in the radial directions up to the surface perimeter. On the other hand, for the reverse concentric configuration, central unit cell element dimensions are chosen to offer maximum phase to the reflected signal, and consequently, the other elements are placed in a manner so that the offered phase to the reflected signal gradually decreases in the radial directions up to the surface perimeter. For the symmetric (i.e., reverse symmetric) case, the middle element of the central or any other horizontal strips of unit cells, offers the minimum phase to the reflected signal, and the other elements of the strip are placed in a manner so that the offered phase to the reflected signal gradually increases in the longitudinal directions up to the boundary of the surface. These identical strips are repeated to conceive final two-dimensional surfaces concerned for practical use. All the four surfaces consist of 9×9=81-unit cell elements, therefore the overall physical dimension for each of these reflecting surfaces is measured as 108 mm×108 mm and printed on a substrate material (e.g., PEC-backed RT-Duroid 5880) having thickness equal to 0.7 mm. The centre point of the central unit cell element in each of the surfaces are taken as the central coordinate point i.e., the (0,0,0) reference point and the position of the source antenna beam patterns are defined accordingly during characterization. A horn antenna radiation pattern is imported as a far-field source at 26.5 GHz, having a gain of 12 dB and angular beamwidth of 40 degree for characterization of these reflecting surfaces.

The one or more surface layouts are characterized with respect to an incoming source radiation pattern to identify one or more reflected radiation pattern parameters. The one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof. The angle of incidence value of the incoming source radiation pattern is varied which is incident at a central region of the one or more surface layouts to control an angle of reflection value. The angle of incidence value of the incoming source radiation pattern is varied which is gradually sweeping over the one or more surface layouts, then the angle of reflection remains within a constant range. The value of the angle of reflection is increased or decreased based on selection of one or more surface layouts.

The sectoral signal coverage design unit 210 is configured to design a real-time sectoral signal coverage based on the one or more reflected radiation pattern parameters of the designed one or more surface layouts and position of one or more Ku-band horn antennas. The incoming source radiation pattern corresponds to a spatial power distribution of one or more Ku-band horn antennas operating at the desired range of frequency. The incoming source radiation pattern from the one or more Ku-band horn antennas which is in conical shape is reflected to a desired direction in a shape of a sectoral fan-beam pattern.

FIG. 7 is an exemplary flow diagram illustrating a method 700 of enabling the real-time sectoral area coverage by the topologically modulated reflecting intelligent surfaces (RIS), according to some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1 and 2.

At step 702, a Minkowski-shaped fractal unit cell 202A is received as an input. The Minkowski-shaped fractal unit cell corresponds to a reflecting unit cell under subwavelength conditions. At step 704, the Minkowski-shaped fractal unit cell 202A is characterized to obtain a unit cell dimension with one or more independent reflection-phase characteristics. The unit cell dimension corresponds to the shape of the Minkowski-shaped fractal unit cell. The one or more independent reflection-phase characteristics corresponds to a reflecting nature of at least one unit cell element over a desired range of frequency. At step 706, one or more distinct unit cell elements are identified based on the one or more independent reflection-phase characteristics. At step 708, one or more surface layouts are generated by one or more distinct unit cell elements. The one or more surface layouts corresponds to: (i) concentric surface layouts, (ii) reverse concentric surface layouts, (iii) symmetric surface layouts, and (iv) reverse symmetric surface layouts. The concentric surface layouts and the reverse concentric surface layouts are designed by distributing the identified one or more distinct unit cell elements to obtain a radially variant homogeneous phase gradient. The symmetric surface layouts and the reverse symmetric surface layouts are designed by distributing the identified one or more distinct unit cell elements to obtain a longitudinally variant homogeneous phase gradient.

At step 710, the one or more surface layouts are characterized with respect to an incoming source radiation pattern to identify one or more reflected radiation pattern parameters. The one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof. The angle of incidence value of the incoming source radiation pattern is varied which is incident at a central region of the one or more surface layouts to control an angle of reflection value. The angle of incidence value of the incoming source radiation pattern is varied which is gradually sweeping over the one or more surface layouts, then the angle of reflection remains within a constant range. The value of the angle of reflection is increased or decreased based on selection of one or more surface layouts.

Finally, At step 712, a real-time sectoral signal coverage is designed based on the one or more reflected radiation pattern parameters of the designed one or more surface layouts and position of one or more Ku-band horn antennas. The incoming source radiation pattern corresponds to a spatial power distribution of at least one Ku-band horn antenna operating at the desired range of frequency. The incoming source radiation pattern from the at least one Ku-band horn antenna which is in conical shape is reflected to a desired direction in a shape of a sectoral fan-beam pattern.

Experimental Results

A use-case scenario is also explained consisting of three horn antennas and a chosen reflecting intelligent surface (RIS), which highlights designing of a real-time sectoral

Figure 8A:
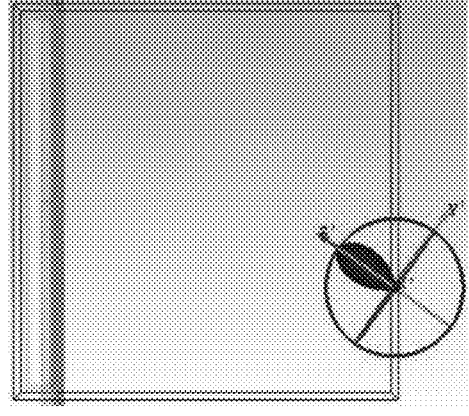
FIG. 8A through FIG. 8D are exemplary schematic representations illustrating different process classifications for characterization of the designed reflecting surfaces, according to some embodiments of the present disclosure.
Figure 8B:
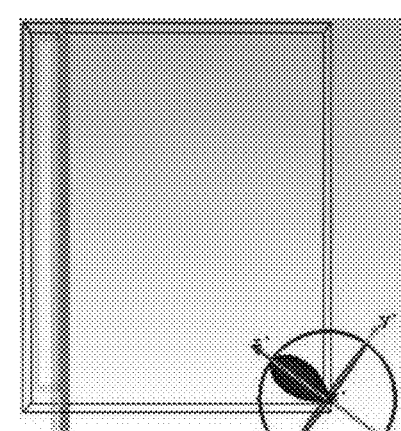
Figure 8C:
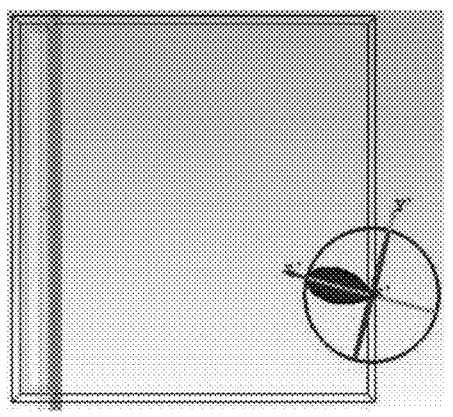
Figure 8D:
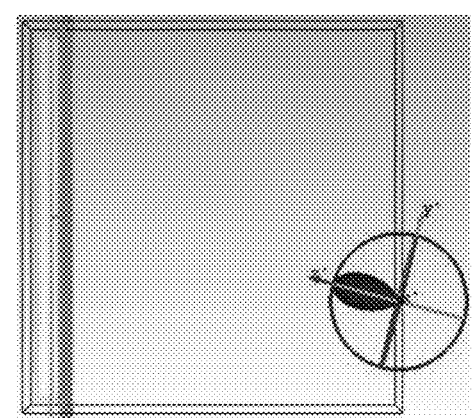

11 signal coverage under practical office environment conditions. FIG. 8A through FIG. 8D are exemplary schematic representations illustrating different process classifications for characterization of the designed reflecting surfaces, according to some embodiments of the present disclosure. For example, to characterize a reflecting surface, one needs to study one or more reflecting characteristics under different incidence conditions i.e., two separate broadly divided conditions are created. FIG. 8A and FIG. 8B describe the conditions where the source is moved at a constant radius w.r.t the centre of the defined coordinate system to generate different angles of incidence but always the main beam is incident at the central position of the concerned surfaces. Similarly, FIG. 8C and FIG. 8D describe the condition where the source radiation pattern is kept at a fixed position (i.e., namely at 0 mm, −25 mm, −100 mm position) w.r.t to the origin of the defined coordinate system, and the same is rotated to irradiate the surface at different incidence angles as the incident beam sweeps over the actual surface area.

Figure 9A:
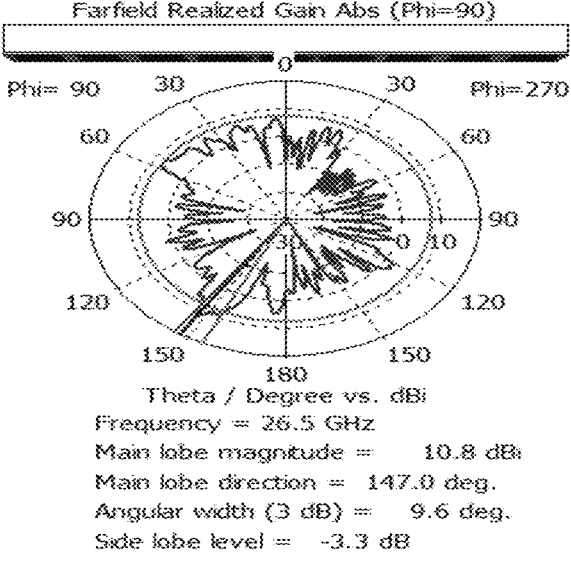
Figure 9B:
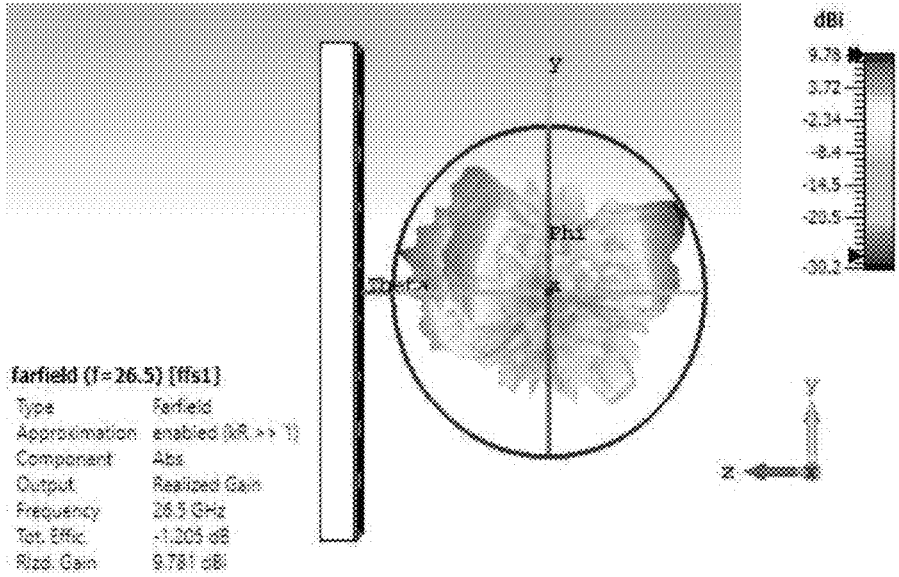
Figure 10A:
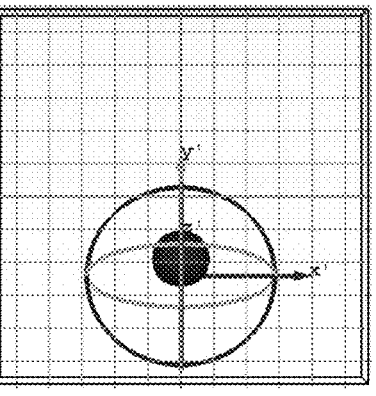
Figure 10B:
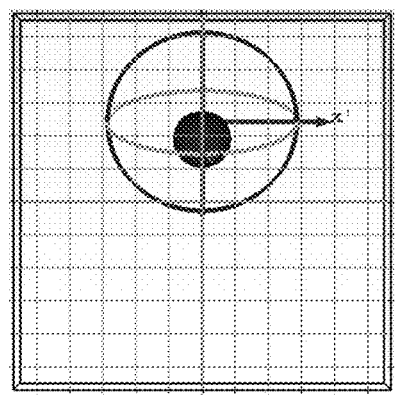
Figure 10C:
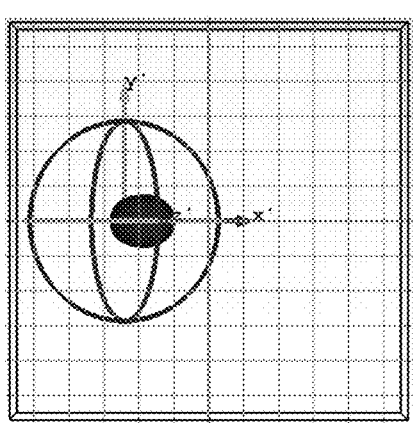
Figure 10D:
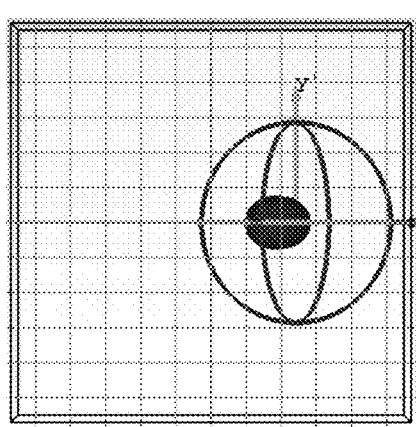
Figure 11A:
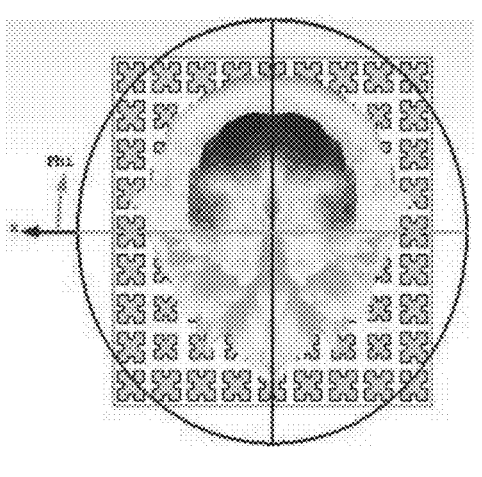
FIG. 11A through FIG. 11H are exemplary schematic representations illustrating corresponding reflected patterns obtained from the reverse concentric reflecting intelligent surface design for one or more horn antennas positioned at specific coordinates, according to some embodiments of the present disclosure.
Figure 11B:
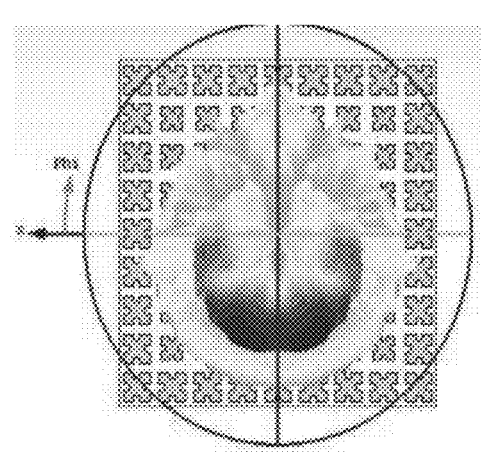
Figure 11C:
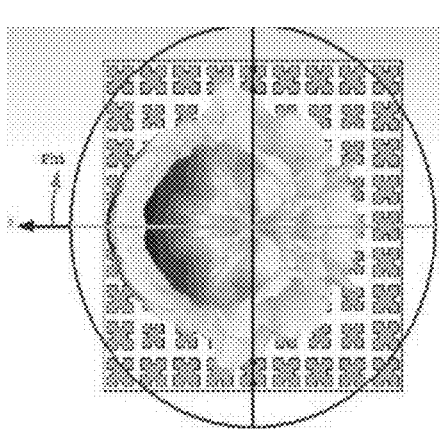
Figure 11D:
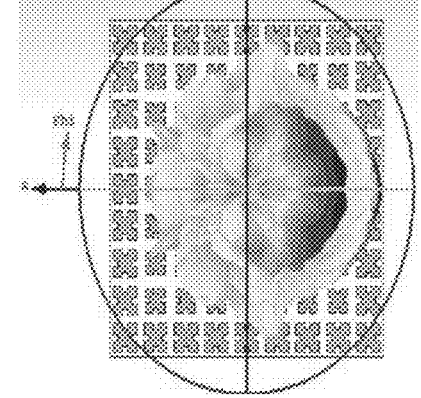
Figure 11E:
Figure 11F:
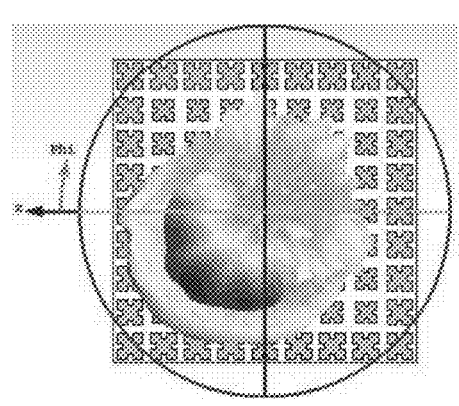
Figure 11G:
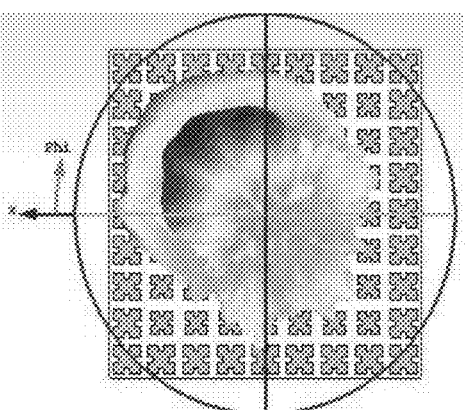
Figure 11H:
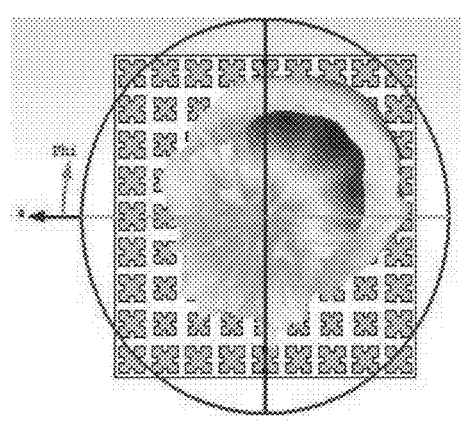

FIG. 9A through FIG. 9E are exemplary schematic representations illustrating one or more parameters of interest in characterization of the designed reflecting surfaces, according to some embodiments of the present disclosure. FIG. 9A illustrates a constant phi (phi=90 deg) 2D radiation plot for the reflected beam. FIG. 9B illustrates a 3D side view of the reflected beam w.r.t the surface. FIG. 90 illustrates constant theta (theta-angle of reflection) 2D radiation plot for the reflected beam. FIG. 9D illustrates a 3D top view of the reflected beam w.r.t the surface. FIG. 9E illustrates a 3D front view of the reflected beam w.r.t the surface. For example, the images are provided as the results for irradiating the reverse concentric surface with the source placed at a position (0 mm, −25 mm, −100 mm) w.r.t the defined coordinates and the angle of incidence is 20 deg, when the source pattern is rotated w.r.t corresponding own shape centre, in this observation. Two-dimensional (2D) and three-dimensional (3D) plots are as depicted in FIGS. 9A and 9B, and FIGS. 9C and 9E are closely related, and provide basic definition for the one or more parameters which are tabulated for characterization. FIGS. 9A and 9B, which provide an elevation angle, which is basically the angle of reflection towards the direction in which the beam is pointed, and elevation beamwidth provides the 3 dB beamwidth for tabulation. Elevation gain is also tabulated. Similarly, if FIGS. 9C and 9E are compared, which provide the sectoral coverage details towards broadside direction of reflection. Sectoral 3 dB beamwidth and sectoral gain parameters are tabulated. The four parameters quantitatively justify, standard conical beam pattern of the horn is reflected in the shape of a sectoral arc at different angles of reflection corresponding to a particular angle of incidence. The surfaces are suitable as reflecting surfaces for controlled sectoral coverage under office environment applications.

In an exemplary embodiment, the four structures i.e., concentric, reverse concentric, symmetric, and reverse symmetric are rigorously characterized under these two conditions and the outcomes are tabulated in TABLE 2 through TABLE 9 respectively, which provides the detailed characterization results for the two investigating cases for varying angles of incidence. Source is placed at distance of 100 mm from the surfaces under all circumstances. For example, concentric surface reflection characterization i.e., when the incoming beam for different incident angles is always incident at the centre, are as shown in TABLE 2:

12

TABLE 2

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 18 | 9.44 | 13.5 | 9.44 | 19.3 |
| 2 | 10 | 32 | 8.88 | 11 | 8.99 | 72.8 |
| 3 | 15 | 30 | 9.97 | 5.4 | 9.97 | 76 |
| 4 | 20 | 33 | 11.6 | 6.3 | 11.6 | 66.2 |
| 5 | 25 | 37 | 11.4 | 9.2 | 11.4 | 57.5 |
| 6 | 30 | 39 | 11 | 9.3 | 11 | 55.4 |
| 7 | 35 | 42 | 10.4 | 11 | 10.4 | 57.7 |

For example, reverse concentric surface reflection characterization i.e., when the incoming beam for different incident angles is always incident at the centre, are as shown in TABLE 3:

TABLE 3

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 29 | 7.93 | 14.8 | 7.94 | 77.4 |
| 2 | 10 | 26 | 8.12 | 9.84 | 8.14 | 92.3 |
| 3 | 15 | 30 | 9.6 | 9 | 9.6 | 70.1 |
| 4 | 20 | 33 | 10.7 | 9.8 | 10.7 | 62.1 |
| 5 | 25 | 37 | 11.6 | 9.5 | 11.6 | 52.1 |
| 6 | 30 | 39 | 11 | 10.1 | 11 | 48.8 |
| 7 | 35 | 44 | 11.4 | 11.2 | 11.4 | 46.6 |

For example, symmetric surface reflection characterization i.e., when the incoming beam for different incident angles is always incident at the centre, are as shown in TABLE 4:

TABLE 4

| SI. No. | Angle of Incidence (deg) | Angle of Reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 43 | 6.79 | 13.3 | 6.78 | 14 |
| 2 | 10 | 40 | 9.02 | 3.71 | 9.02 | 34.5 |
| 3 | 15 | 36 | 9.02 | 5.1 | 9.02 | 78.9 |
| 4 | 20 | 32 | 9.44 | 9.7 | 10.3 | 66.7 |
| 5 | 25 | 28 | 10.1 | 10.5 | 10.6 | 59 |
| 6 | 30 | 27 | 10.5 | 9.6 | 10.5 | 56.9 |
| 7 | 35 | 23 | 11.3 | 10.8 | 11.3 | 51.7 |

For example, reverse symmetric surface reflection characterization i.e., when the incoming beam for different incident angles is always incident at the centre, are as shown in TABLE 5:

TABLE 5

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 47 | 8.43 | 14.8 | 8.43 | 23 |
| 2 | 10 | 40 | 9.43 | 10.3 | 9.43 | 20.9 |
| 3 | 15 | 36 | 11.4 | 8.6 | 11.4 | 24 |
| 4 | 20 | 32 | 11.9 | 12.3 | 11.9 | 26.9 |
| 5 | 25 | 29 | 12.4 | 10.1 | 12.4 | 22.5 |
| 6 | 30 | 27 | 12.5 | 9.7 | 12.5 | 18.4 |
| 7 | 35 | 23 | 13 | 10.8 | 13 | 16.7 |

For example, concentric surface reflection characterization i.e., when the incoming beam for different incident angles sweeps over the surface, and source position (0, −25, −100) w.r.t the defined coordinate system, are as shown in TABLE 6:

TABLE 6

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 35 | 5.7 | 4.6 | 6.72 | 38.6 |
| 2 | 10 | 33 | 6.1 | 9.5 | 8.41 | 91.0 |
| 3 | 15 | 36 | 8.75 | 4.9 | 9.98 | 68.7 |
| 4 | 20 | 33 | 10.6 | 5.8 | 10.8 | 64.8 |
| 5 | 25 | 33 | 10.2 | 12.5 | 10.7 | 65.9 |
| 6 | 30 | 36 | 10 | 12.8 | 10.4 | 89.9 |
| 7 | 35 | 33 | 11.8 | 16.0 | 10.3 | 89.8 |

For example, reverse concentric surface reflection characterization i.e., when the incoming beam for different incident angles sweeps over the surface, and source position (0, −25, −100) w.r.t the defined coordinate system, are as shown in TABLE 7:

TABLE 7

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 33 | 7.5 | 12 | 5.77 | 99.7 |
| 2 | 10 | 32 | 7.71 | 12.7 | 7.91 | 85.2 |
| 3 | 15 | 33 | 9.88 | 10.2 | 9.97 | 63.8 |
| 4 | 20 | 33 | 10.8 | 9.6 | 11.1 | 60.8 |
| 5 | 25 | 32 | 10.9 | 11.1 | 11 | 65.8 |
| 6 | 30 | 32 | 11.5 | 10 | 10.8 | 66.8 |
| 7 | 35 | 30 | 11 | 9.5 | 10.3 | 71.2 |

For example, symmetric surface reflection characterization i.e., when the incoming beam for different incident angles sweeps over the surface, and source position (0, −25, −100) w.r.t the defined coordinate system, are as shown in TABLE 8:

TABLE 8

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 33 | 7 | 15.7 | 6.69 | 34.8 |
| 2 | 10 | 34 | 6.61 | 8.4 | 8.16 | 38.5 |
| 3 | 15 | 36 | 9.26 | 4.6 | 10.6 | 40.9 |
| 4 | 20 | 33 | 8.37 | 10.6 | 10.3 | 66.6 |
| 5 | 25 | 35 | 10.2 | 13.1 | 10.7 | 65.9 |
| 6 | 30 | 35 | 11.4 | 14.6 | 10.4 | 89.9 |
| 7 | 35 | 35 | 11.8 | 16 | 10.3 | 89.8 |

For example, reverse symmetric surface reflection characterization i.e., when the incoming beam for different incident angles sweeps over the surface, and source position (0, −25, −100) w.r.t the defined coordinate system, are as shown in TABLE 9:

TABLE 9

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | 5 | 30 | 7.25 | 10.1 | 7 | 110.7 |
| 2 | 10 | 31 | 7.4 | 13.4 | 7.9 | 98.8 |
| 3 | 15 | 33 | 9.53 | 11.3 | 9.98 | 63.5 |

TABLE 9-continued

| SI. No. | Angle of incidence (deg) | Angle of reflection (deg) | Elevation Gain (dB) | Elevation Beamwidth (deg) | Sectoral Gain (dB) | Sectoral Beamwidth (deg) |
|---|---|---|---|---|---|---|
| 4 | 20 | 33 | 10.7 | 10.6 | 11.2 | 60.8 |
| 5 | 25 | 32 | 10.8 | 12.5 | 11 | 67.5 |
| 6 | 30 | 30 | 11.2 | 12.7 | 11.4 | 69.8 |
| 7 | 35 | 30 | 11.5 | 11.5 | 10.6 | 69.9 |

TABLE 2 through TABLE 5 highlight the reflection conditions for the cases where the incoming beam for different incident angles is always incident at the centre of the concerned surfaces. The conditions quantitatively describe the individual specialties of the surfaces. Also, for the concentric and reverse concentric scenarios, a gradual increase in the angle of reflection values is observed for a similar increase in the values of angle of incidence. On the other hand, for the symmetric and reverse symmetric designs, the angle of reflection values gradually decreased as the angle of incidence values were increased in the experiment. Similarly, TABLE 6 through TABLE 9 highlights the reflection conditions for the cases where the incoming beam for different incidence angles sweeps over the surface. For such scenarios all the surfaces described a stable pattern for the fixed position of the source chosen for this set of investigations, for varying angles of incidence. For a wide range of values for angles of incidence, varying from 5 degree to 35 degree, the angle of reflection values varied only between 30 degrees to 36 degrees, with stable elevation and sectoral patterns conserved for 26.5 GHz operations.

In another use-case example, characterization of the surfaces for varying source positions i.e., either vertically or horizontally are considered. TABLE 10 through TABLE 13 highlight the reflection conditions for different source positions placed with respect to the defined coordinate system in the previous section. Considering all the surfaces, and all the source positions, the angle of reflection varied between 31 degrees to 36 degrees depending on the chosen surface for a defined value of angle of incidence (=20 degree). The elevation and sectoral pattern characteristics remain stable, and continuously provide sectoral arc like coverage patterns, for D2D communication scenarios under office environment applications.

For example, concentric surface reflection characterization for fixed angle of incidence (=20 degree) but with different source locations placed as per the defined coordinate system, the source is always kept at distance of 100 mm from the surface, are as shown in TABLE 10:

TABLE 10

| SI. No. | Source Position | Angle of reflection (deg) | Elevation Gain (dB) | Elevation Beamwidth (deg) | Sectoral Gain (dB) | Sectoral Beamwidth (deg) |
|---|---|---|---|---|---|---|
| 1 | (0, +25) | 33 | 10.7 | 5.9 | 10.8 | 64.3 |
| 2 | (0, −25) | 33 | 10.2 | 5.8 | 10.8 | 64.8 |
| 3 | (+25, 0) | 33 | 12.2 | 10.1 | 9.34 | 60.9 |
| 4 | (−25, 0) | 33 | 12 | 10.1 | 9.39 | 60.8 |
| 5 | (−25, +25) | 36 | 9.21 | 10.1 | 11.0 | 66.8 |
| 6 | (+25, +25) | 36 | 8.17 | 9.4 | 11.8 | 51.5 |
| 7 | (+25, −25) | 34 | 8.1 | 12.3 | 12.6 | 28.9 |
| 8 | (−25, −25) | 35 | 8.2 | 11.0 | 12.3 | 46.7 |

For example, reverse concentric surface reflection characterization for fixed angle of incidence (=20 degree) but with different source locations placed as per the defined coordinate system, the source is always kept at distance of 100 mm from the surface, are as shown in TABLE 11:

TABLE 11

| SI. No. | Source Position | Angle of reflection (deg) | Elevation Gain (dB) | Elevation Beamwidth (deg) | Sectoral Gain (dB) | Sectoral Beamwidth (deg) |
|---------|-----------------|---------------------------|---------------------|---------------------------|--------------------|--------------------------|
| 1 | (0, +25) | 33 | 10.8 | 9.9 | 11 | 61.2 |
| 2 | (0, −25) | 33 | 10.8 | 9.6 | 11.1 | 60.8 |
| 3 | (+25, 0) | 33 | 10.8 | 5.8 | 11.2 | 54.3 |
| 4 | (−25, 0) | 33 | 11 | 6.1 | 11.2 | 53.4 |
| 5 | (−25, +25) | 31 | 9.01 | 11.6 | 10.5 | 65 |
| 6 | (+25, +25) | 31 | 8.91 | 11.6 | 10.4 | 65.4 |
| 7 | (+25, −25) | 31 | 9.08 | 10.9 | 10.5 | 64.9 |
| 8 | (−25, −25) | 31 | 9.1 | 10.8 | 10.4 | 65 |

For example, symmetric surface reflection characterization for fixed angle of incidence (=20 degree) but with different source locations placed as per the defined coordinate system, the source is always kept at distance of 100 mm from the surface, are as shown in TABLE 12:

TABLE 12

| SI. No. | Source Position | Angle of Reflection (deg) | Elevation Gain (dB) | Elevation Beamwidth (deg) | Sectoral Gain (dB) | Sectoral Beamwidth (deg) |
|---------|-----------------|---------------------------|---------------------|---------------------------|--------------------|--------------------------|
| 1 | (0, +25) | 33 | 8.48 | 10.5 | 10.3 | 66.7 |
| 2 | (0, −25) | 33 | 8.37 | 10.6 | 10.3 | 66.6 |
| 3 | (+25, 0) | 33 | 10.9 | 6.6 | 8.55 | 91.0 |
| 4 | (−25, 0) | 33 | 10.9 | 6.6 | 8.56 | 90.7 |
| 5 | (−25, +25) | 35 | 9.22 | 11.2 | 10.9 | 47.1 |
| 6 | (+25, +25) | 35 | 9.05 | 11.2 | 11.0 | 49.3 |
| 7 | (+25, −25) | 35 | 9.16 | 10.9 | 11.0 | 30.9 |
| 8 | (−25, −25) | 35 | 9.22 | 10.4 | 11.0 | 33.1 |

For example, reverse symmetric surface reflection characterization for fixed angle of incidence (=20 degree) but with different source locations placed as per the defined coordinate system, the source is always kept at distance of 100 mm from the surface, are as shown in TABLE 13:

TABLE 13

| SI. No. | Source Position | Angle of reflection (deg) | Elevation Gain (dB) | Elevation Beamwidth (deg) | Sectoral Gain (dB) | Sectoral Beamwidth (deg) |
|---------|-----------------|---------------------------|---------------------|---------------------------|--------------------|--------------------------|
| 1 | (0, +25) | 33 | 10.7 | 10.9 | 11.2 | 60.8 |
| 2 | (0, −25) | 33 | 10.7 | 10.6 | 11.2 | 60.8 |
| 3 | (+25, 0) | 34 | 11.5 | 11.3 | 11.6 | 49.7 |
| 4 | (−25, 0) | 34 | 11.6 | 11.1 | 11.7 | 49.2 |
| 5 | (−25, +25) | 34 | 9.01 | 9.8 | 12 | 43.3 |
| 6 | (+25, +25) | 34 | 8.9 | 9.8 | 12 | 41.6 |
| 7 | (+25, −25) | 34 | 8.9 | 10 | 11.9 | 41.8 |
| 8 | (−25, −25) | 34 | 8.97 | 9.9 | 11.9 | 42.5 |

FIG. 10A through FIG. 10H are exemplary schematic representations illustrating different horn antenna positions for irradiating a particular reflecting surface, according to some embodiments of the present disclosure. FIG. 11A through FIG. 11H are exemplary schematic representations illustrating corresponding reflected patterns obtained from the reverse concentric reflecting intelligent surface design for one or more horn antennas positioned at specific coordinates, according to some embodiments of the present disclosure. For example, eight distinct feeding horn antenna positions, facing towards the viewer i.e., from other side of the reflecting surfaces, and corresponding reflected three-dimensional radiation patterns, seeing from the front of the surfaces in each of these positional arrangements. The radiation characteristics enable the user to divide the region of operation into eight identical sectoral regions as per geometric conceptualization.

Figure 12:
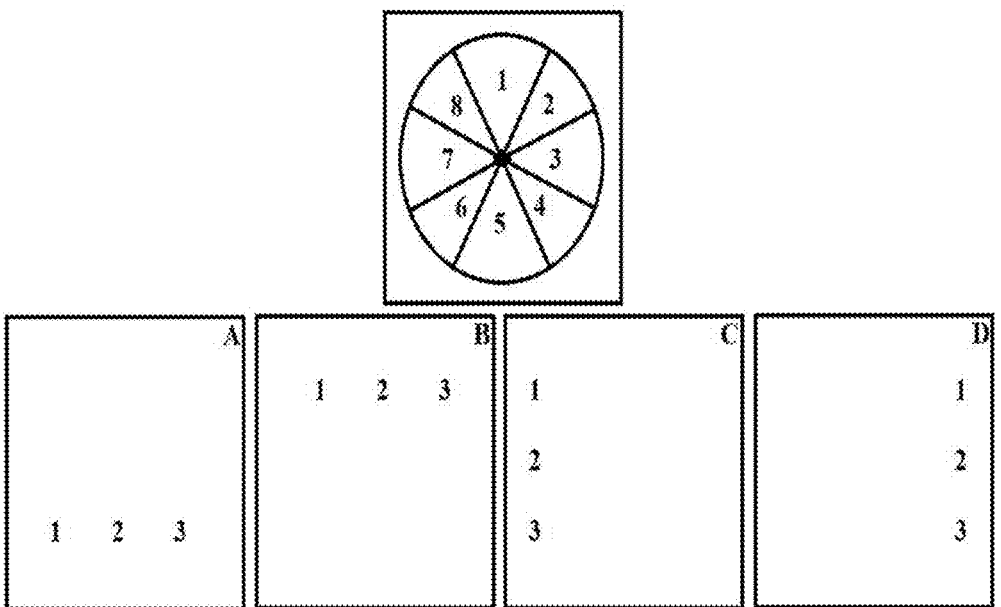
FIG. 12 is an exemplary block diagram illustrating different regions of defined reflected radiation and four distinct configurations including three defined horn antenna positions and concerned reflecting surface, according to some embodiments of the present disclosure.

FIG. 12 is an exemplary block diagram illustrating different regions of defined reflected radiation and four distinct configurations including three defined horn antenna positions and concerned reflecting surface, according to some embodiments of the present disclosure. A 360-degree circular region is described for the reflected radiation patterns as if they are emanating from a square shaped larger reflecting surface and divides into eight distinct sectors for quantitatively describing the reflection characteristics. Also, four distinct configurations which includes three defined horn antenna positions for each, and the concerned reflecting surface can be taken as any one of the proposed four surfaces as described in FIGS. 6A through 6D. TABLE 14 describes the reflection characteristics for each of the four proposed configurations with different horn antenna positions, nature of which remain qualitatively similar to each other irrespective of the surfaces chosen with minor quantitative variations in case of the individual emanated radiation patterns.

TABLE 14

| Proposed configuration | Radiating Source | Sector Covered by Reflected Radiation |
|------------------------|------------------|---------------------------------------|
| A | 1 | 2 |
|   | 2 | 1 |
|   | 3 | 8 |
| B | 1 | 4 |
|   | 2 | 5 |
|   | 3 | 6 |
| C | 1 | 4 |
|   | 2 | 3 |
|   | 3 | 2 |
| D | 1 | 6 |
|   | 2 | 7 |
|   | 3 | 8 |

The embodiment of present disclosure herein addresses unresolved problem of designing a class of entirely passive Reflecting Intelligent Surfaces (RIS), using metamaterial-based unit cell elements for practical applications under 5G network-based office environment or D2D communication scenarios. The embodiment thus provides topologically modulated reflecting intelligent surfaces and method to enable sectoral area coverage under network applications. The embodiment of present disclosure includes a choice of one or more dimensions i.e., changing one or more physical dimensions (e.g., scaling the size of the elements) of the unit cells (e.g., Minkowski-shaped fractal metamaterial unit cells and associated distinctive layouts), one can quantitatively control phase reflection characteristics based on the nature of reflection-phase gradient, which is used to identify five distinct unit cell elements to conceive the final reflecting surfaces. The design of the integrated system with three horn antennas along with a particular reflecting surface, augmented together to realize a tri-sectoral coverage option for each of the system configurations. The embodiment of the present disclosure provides a topological variation of the unit cells, i.e., changing physical dimensions of the elements to control phase variation and then laying the cells over the surface in a smooth, homogeneous topological manner in terms of phase characteristics, to conceive the desired reflection phenomenon. The design of unit cells and controlling associated physical dimensions for obtaining suitable phase characteristics, and consequently conceiving the single layer surface by topological placement of the unit cells to propose a reflecting surface which reflects the incoming signal from an arbitrary RF source to a desired direction based on the angle of incidence. Also, the choice of Minkowski shaped fractals for the design makes polarization independent for orthogonal waves (i.e., incoming E-fields being oriented in X and Y directions).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
receiving, via one or more hardware processors, a Minkowski-shaped fractal unit cell as an input, wherein the Minkowski-shaped fractal unit cell correspond to a reflecting unit cell under subwavelength conditions;
characterizing, via the one or more hardware processors, the Minkowski-shaped fractal unit cell to obtain a unit cell dimension with one or more independent reflection-phase characteristics, wherein the unit cell dimension corresponds to a shape of the Minkowski-shaped fractal unit cell, and wherein the one or more independent reflection-phase characteristics corresponds to a reflecting nature of at least one unit cell element over a desired range of frequency;
identifying, via the one or more hardware processors, one or more distinct unit cell elements based on the one or more independent reflection-phase characteristics;
generating, via the one or more hardware processors, one or more surface layouts by the one or more distinct unit cell elements;
characterizing, via the one or more hardware processors, the one or more surface layouts with respect to an incoming source radiation pattern to identify one or more reflected radiation pattern parameters, wherein the one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof; and
designing, via the one or more hardware processors, a real-time sectoral signal coverage based on the one or more reflected radiation pattern parameters of the designed one or more surface layouts and position of one or more Ku-band horn antennas.

2. The processor implemented method of claim 1, wherein the one or more surface layouts corresponds to: (i) concentric surface layouts, (ii) reverse concentric surface layouts, (iii) symmetric surface layouts, and (iv) reverse symmetric surface layouts.

3. The processor implemented method of claim 2, wherein the concentric surface layouts and the reverse concentric surface layouts are designed by distributing the identified one or more distinct unit cell elements to obtain a radially variant homogeneous phase gradient, and wherein the symmetric surface layouts and the reverse symmetric surface layouts are designed by distributing the identified one or more distinct unit cell elements to obtain a longitudinally variant homogeneous phase gradient.

4. The processor implemented method of claim 1, wherein an angle of incidence value of the incoming source radiation pattern is varied which is incident at a central region of the one or more surface layouts to control an angle of reflection value, wherein the angle of incidence value of the incoming source radiation pattern is varied which is gradually sweeping over the one or more surface layouts, then the angle of reflection remains within a constant range, and wherein the value of the angle of reflection is increased or decreased based on selection of the one or more surface layouts.

5. The processor implemented method of claim 1, wherein the incoming source radiation pattern corresponds to a spatial power distribution of at least one Ku-band horn antenna operating at the desired range of frequency, and wherein the incoming source radiation pattern from the at least one Ku-band horn antenna which is in conical shape is reflected to a desired direction in a shape of a sectoral fan-beam pattern.

6. A system, comprising:

a memory storing a plurality of instructions;

one or more communication interfaces; and one or more hardware processors coupled to the memory via the one or more communication interfaces, wherein the one or more hardware processors are configured by the instructions to:

receive a Minkowski-shaped fractal unit cell as an input, wherein the Minkowski-shaped fractal unit cell correspond to a reflecting unit cell under subwavelength conditions;

characterize the Minkowski-shaped fractal unit cell to obtain a unit cell dimension with one or more independent reflection-phase characteristics, wherein the unit cell dimension corresponds to a shape of the Minkowski-shaped fractal unit cell, and wherein the one or more independent reflection-phase characteristics corresponds to a reflecting nature of at least one unit cell element over a desired range of frequency;

identify one or more distinct unit cell elements based on the one or more independent reflection-phase characteristics;

generate one or more surface layouts by the one or more distinct unit cell elements;

characterize the one or more surface layouts with respect to an incoming source radiation pattern to identify one or more reflected radiation pattern parameters, wherein the one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof; and design a real-time sectoral signal coverage based on the one or more reflected radiation pattern parameters of the designed one or more surface layouts and position of one or more Ku-band horn antennas.

7. The system of claim 6, wherein the one or more surface layouts corresponds to: (i) concentric surface layouts, (ii) reverse concentric surface layouts, (iii) symmetric surface layouts, and (iv) reverse symmetric surface layouts.

8. The system of claim 7, wherein the concentric surface layouts and the reverse concentric surface layouts are designed by distributing the identified one or more distinct unit cell elements to obtain a radially variant homogeneous phase gradient, and wherein the symmetric surface layouts and the reverse symmetric surface layouts are designed by distributing the identified one or more distinct unit cell elements to obtain a longitudinally variant homogeneous phase gradient.

9. The system of claim 6, wherein an angle of incidence value of the incoming source radiation pattern is varied which is incident at a central region of the one or more surface layouts to control an angle of reflection value, wherein the angle of incidence value of the incoming source radiation pattern is varied which is gradually sweeping over the one or more surface layouts, then the angle of reflection remains within a constant range, and wherein the value of the angle of reflection is increased or decreased based on selection of the one or more surface layouts.

10. The system of claim 6, wherein the incoming source radiation pattern corresponds to a spatial power distribution of at least one Ku-band horn antenna operating at the desired range of frequency, and wherein the incoming source radiation pattern from the at least one Ku-band horn antenna which is in conical shape is reflected to a desired direction in a shape of a sectoral fan-beam pattern.

11. One or more non-transitory machine-readable information storage mediums comprising one or more instructions which when executed by one or more hardware processors cause:

receiving a Minkowski-shaped fractal unit cell as an input, wherein the Minkowski-shaped fractal unit cell correspond to a reflecting unit cell under subwavelength conditions;

characterizing the Minkowski-shaped fractal unit cell to obtain a unit cell dimension with one or more independent reflection-phase characteristics, wherein the unit cell dimension corresponds to a shape of the Minkowski-shaped fractal unit cell, and wherein the one or more independent reflection-phase characteristics corresponds to a reflecting nature of at least one unit cell element over a desired range of frequency;

identifying one or more distinct unit cell elements based on the one or more independent reflection-phase characteristics;

generating one or more surface layouts by the one or more distinct unit cell elements;

characterizing the one or more surface layouts with respect to an incoming source radiation pattern to identify one or more reflected radiation pattern parameters, wherein the one or more reflected radiation pattern parameters corresponds to: (i) an angle of a reflected radiation pattern, or (ii) a beamwidth of the reflected radiation pattern, or (iii) a gain of the reflected radiation pattern, and (iv) combination thereof; and designing a real-time sectoral signal coverage based on the one or more reflected radiation pattern parameters of the designed one or more surface layouts and position of one or more Ku-band horn antennas.

12. The one or more non-transitory machine-readable information storage mediums of claim 11, wherein the one or more surface layouts corresponds to: (i) concentric surface layouts, (ii) reverse concentric surface layouts, (iii) symmetric surface layouts, and (iv) reverse symmetric surface layouts.

13. The one or more non-transitory machine-readable information storage mediums of claim 12, wherein the concentric surface layouts and the reverse concentric surface layouts are designed by distributing the identified one or more distinct unit cell elements to obtain a radially variant homogeneous phase gradient, and wherein the symmetric surface layouts and the reverse symmetric surface layouts are designed by distributing the identified one or more distinct unit cell elements to obtain a longitudinally variant homogeneous phase gradient.

14. The one or more non-transitory machine-readable information storage mediums of claim 11, wherein an angle of incidence value of the incoming source radiation pattern is varied which is incident at a central region of the one or more surface layouts to control an angle of reflection value, wherein the angle of incidence value of the incoming source radiation pattern is varied which is gradually sweeping over the one or more surface layouts, then the angle of reflection remains within a constant range, and wherein the value of the angle of reflection is increased or decreased based on selection of the one or more surface layouts.

15. The one or more non-transitory machine-readable information storage mediums of claim 11, wherein the incoming source radiation pattern corresponds to a spatial power distribution of at least one Ku-band horn antenna operating at the desired range of frequency, and wherein the incoming source radiation pattern from the at least one Ku-band horn antenna which is in conical shape is reflected to a desired direction in a shape of a sectoral fan-beam pattern.

\* \* \* \* \*